Feb. 21, 1967    J. W. HENLEY    3,305,227
HIGH DEFLECTION SPRING OR BUMPER
Filed Nov. 13, 1964
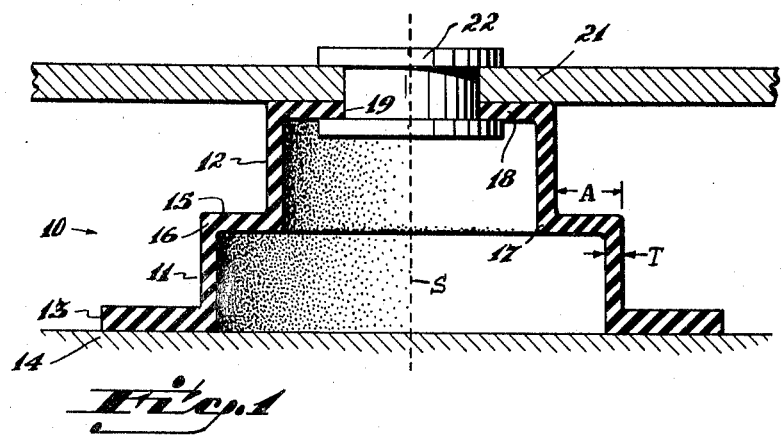
Fig. 1
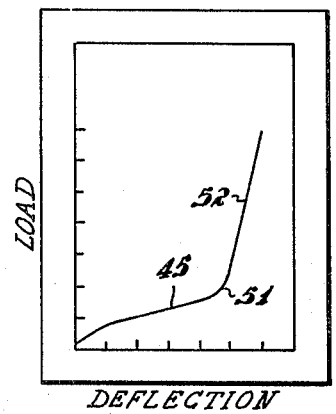
Fig. 2
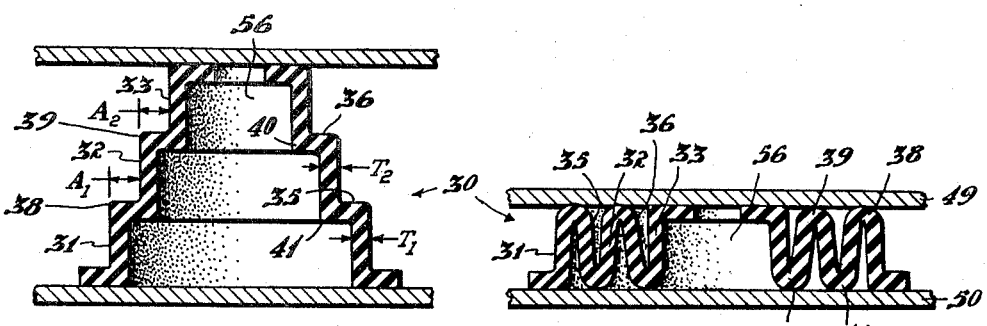
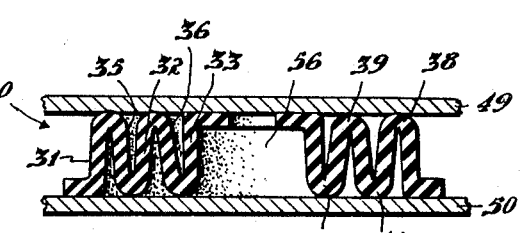
Fig. 3
Fig. 4
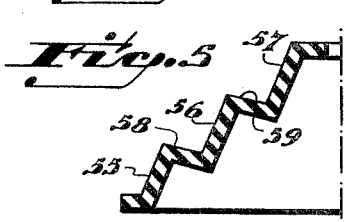
Fig. 5
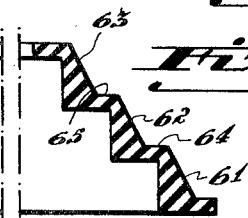
Fig. 6
INVENTOR.
John W. Henley
BY Wood, Herron & Evans
ATTORNEYS 3,305,227
HIGH DEFLECTION SPRING OR BUMPER
John W. Henley, Willoughby, Ohio, assignor to The Eagle-Picher Company, Cincinnati, Ohio, a corporation of Ohio
Filed Nov. 13, 1964, Ser. No. 411,021
6 Claims. (Cl. 267—1)

This invention relates to elastomeric compression springs having a high deflection rate.

The spring or bumper of this invention is of the type which demonstrates a relatively large yield or deformation under a given applied load. Otherwise put, this spring is characterized by an ability to be compressed resiliently over a large proportion, usually more than half, of its free or unloaded height, in response to a relatively small load. Springs having such a high deflection rate are especially useful as a means of absorbing shock gradually, for example, as vehicular axle springs or shock absorbers.

Many spring or bumper applications require a spring which will yield substantially in taking up or cushioning a given load, so that the deceleration of the load is not unduly severe. The problem can be visualized by considering the low rate at which, for example, a solid rubber bumper deforms when subjected to a load: the bumper deforms relatively slightly as load increases, especially if the rubber is hard. Such a spring or bumper decelerates movement at a rate which is faster than desirable. Early attempts to produce a bumper which would deform more rapidly, that is, which would yield a greater distance in response to a given applied load, consisted of attempting to reduce the hardness of rubber. However, most low hardness rubbers do not have physical properties to perform satisfactorily. Closed cell foam materials have also been used as high deflection springs, but under high loadings and continued flexing these foam materials have tended to break down rather rapidly.

The spring or bumper of this invention is a new solution to the problem of providing a high deflection spring. It comprises a spring which is of hollow, radially symmetrical configuration, and which is characterized by a sequential series of "steps" aligned in the axial direction and of progressively decreasing radial dimension. Each step is inset from the next proximate larger step by an annulus, face, or intermediate area which has an external width greater than the thickness of the wall material of the larger step which the face joins articulately at its outer periphery.

The spring can best be further described by reference to the accompanying drawings in which, FIGURE 1 is an axial cross section of one preferred form of a spring or bumper embodying the invention, as mounted between a pair of spaced load-bearing members;

FIGURE 2 is a graph showing the manner in which the deflection of the spring shown in FIG. 1 changes with the applied load;

FIGURE 3 is an axial section through another form of spring in accordance with the invention;

FIGURE 4 is an axial section through a spring of the type shown in FIG. 3 under approximately 75% deflection, showing the manner in which the steps and face areas between them deflect under load;

FIGURE 5 is a fragmentary axial section through a modified form of spring in accordance with the invention, having stepped wall portions which are conical rather than cylindrical in the unstressed condition and having hinge areas connecting the stepped wall portions which are conical rather than planar; and FIGURE 6 is a fragmentary axial section through another modified form of spring in accordance with the invention, having tapered stepped wall portions which are of non-uniform wall thickness.

The preferred form of spring or bumper designated generally at 10 in FIGURE 1 is of stepped hollow configuration having a larger diameter step or stepped wall portion 11 and a smaller diameter step or stepped wall portion 12. The steps 11 and 12 are cylindrical in the embodiment shown in FIGURE 1, but they may be polygonal or elliptical or of other shapes for special purposes.

A horizontally disposed base or mounting flange 13 may be provided at the lower edge of step 11 for securing or positioning the spring to a frame member 14, which may for example be a plate secured above the axle of a vehicle.

An annulus, intermediate area, or face 15, which is in the no-load or free condition shown in FIGURE 1 preferably resides in a plane perpendicular to the axis of symmetry S of the spring, extends between and joins the larger diameter step 11 and the smaller diameter step 12. This face 15 can articulate or bend relative to step 11 along a hinge area 16 at which it joins the step 11, and can also articulate relative to step 12 along a hinge area 17 at which it joins the step 12. The upper end of the hollow bumper 10 may be closed by a diaphragm or face 18 which may have an aperture or opening 19 formed axially in it.

The bumper 10 is utilized, in a typical instance, by mounting it with its axis of symmetry S disposed vertically between lower and upper load-bearing frame members or structures 14 and 21. The bumper may be connected to the upper frame member 21 by means such as a rivet 22 which extends through the aperture 19 in the diaphragm 18 at the upper end of the bumper. Flange 13 of the bumper may be secured to the lower frame member 14 by suitable means not shown, although it is not always necessary that both ends of the bumper be secured.

In accordance with this invention the radial dimension or width A of the face 15, measured from the outside surface of step 12 to the outside surface of step 11, must exceed the wall thickness T of step 11 measured adjacent face 15. The wall thicknesses of face 15 and step 12 are preferably equal to the thickness T of step 11, and it is usually convenient that the bumper have a uniform wall thickness throughout, and which, in any case, is less than A. The criteria that A be greater than T is important for reasons that will appear hereinafter.

When a compressing force is applied to the spring 10, i.e. when the frame members 14 and 21 are forced together, the spring first deforms by articulation of face 15 away from the horizontal toward the vertical, that is, toward parallelness with the axis of symmetry S, between the hinge areas 16 and 17 at which it joins steps 11 and 12 respectively. The deflection and rate in a given instance will of course depend upon the magnitudes of dimensions A and T, the height or axial dimension of step 11, and the hardness of the elastomeric material from which the spring is made.

In FIGURE 3, a modified form of bumper 30 is shown which has a plurality of steps designated as 31, 32, and 33, of successively decreasing diameters. Face portions 35 and 36 are formed between and connect the respective steps 31, 32, and 33. As in the embodiment shown in FIGURE 1, it will be noted that the wall thicknesses $T_1$ and $T_2$ of the steps 31 and 32, measured adjacent faces 35 and 36 respectively, are less than the widths $A_1$ and $A_2$ of the face areas 35 and 36. It is convenient that $A_1 = A_2$, and that $T_1 = T_2$, but unequal face widths and/or wall thicknesses may be used to give desired load-deflection performance. It will also be noted that the construction shown in FIGURE 3 differs from that shown in FIGURE 1 in that each dimension T more closely approaches the associated dimension A.

While it is convenient that the stepped wall portions define cylinders, it is contemplated that they may be conical in the unloaded condition, as shown at 55, 56 and 57 in FIG. 5. The intermediate areas may also define truncated conical surfaces in the unstressed condition, as shown at 58 and 59 in FIG. 5.

Ordinarily, the wall thickness of each step portion of the spring or bumper of this invention will be constant over the height of the step, but for special purposes or in order to provide special load-deflection curves, it may be desirable to form one or more of the steps with a non-uniform wall thickness or with a tapering wall which is thicker at one edge than the other, as shown at 61, 62 and 63 in FIG. 6. In this instance the external width of the intermediate areas 64 and 65 interconnecting the stepped wall portions should exceed the thickness of the next larger respective wall portion measured immediately adjacent the intermediate area.

It is contemplated that the hinge areas wherein a face meets or joins the steps which it connects, corresponding to the areas 38 and 41 in FIGURE 3, can be provided either on the outside surface or on the inside surface with scoring to provide for easier flexing. In any event, however, the external distance measured across the face area between the outside diameter of one step portion and the outside diameter of the next adjacent step portion is greater than the wall thickness of the larger diameter step in a plane through the face area.

As shown by the curve of FIGURE 2, when a load is applied the spring or bumper first compresses at a rather rapid rate. This corresponds to articulation of the face areas about the hinge areas at which they join the steps. As this articulation proceeds the spring deflects at the high rate indicated at 45 in FIG. 2.

With continuing deflection the face areas between the steps are deformed from their normal attitudes into positions approaching parallelness with the axis of symmetry; that is, the faces form conical and eventually almost cylindrical shapes around the axis, as indicated at 35 and 36 in FIGURE 4. Ultimately the face areas 35 and 36 of the bumper come virtually into face-to-face contact with the steps 31, 32, and 33, and the hinge areas 38 and 39 engage and bear upon the frame members 49 and the other hinge areas 40 and 41 engage and bear upon the lower frame member 50.

When the spring has been deformed to this condition the deflection per unit increase in load decreases sharply, corresponding to the knee 51 on the curve in FIG. 2, and thereafter the deflection changes at a much slower rate for a unit increase in load, as indicated at 52, because the step portions 31, 32, and 33 and/or the face areas 35 and 36 are being placed in direct compression. In order to minimize collapse in the radial direction the spring may have a solid cylindrical member mounted or formed in the interior of the spring, within the area 56.

By varying the widths of the face areas and the wall thicknesses T throughout the material it is readily possible to provide a specific spring configuration which, for example, will flex elastically over 50% or more of its free height, or to control the position of the knee 51 on the curve in FIG. 2 with respect to the free height of the spring.

This spring or bumper may be made in elastomeric or rubbery materials such as rubber and polyurethane, and the like. I prefer to use a polyurethane having a Durometer D hardness of about 53.

While I have described a preferred embodiment of my invention, those skilled in the art will readily appreciate that the principles of this invention can be embodied in other forms of springs or bumpers in accordance with the language and spirit of the claims which follow.

I claim:

1. A spring assembly including two opposed relatively movable members and a spring mounted to at least one of said members to be engaged in compression along an axis of movement between said members, said spring comprising a hollow body of elastomeric material, said body having a plurality of stepped wall portions of sequentially decreasing outside diameters, each pair of proximate wall portions being joined together by an intermediate area, each said intermediate area being defined between an outer edge which articulately joins the stepped wall portion proximate to it which is of the greater diameter and an inner edge which articulately joins the stepped wall portion proximate to it which is of the lesser diameter, the edges at which each intermediate area joins the respective wall portions constituting hinge areas about which said intermediate area flexes upon axial deformation of said spring, the width of each intermediate area being greater than the wall thickness of the greater diameter wall portion joined by said intermediate area, said relatively movable members having surface areas disposed to bear upon said hinge areas around the peripheries thereof and thereby place said intermediate areas in direct compression between said members when said members are in closest proximity.

2. A highly compressible spring assembly including two opposed relatively movable members and a spring mounted to at least one of said members to be engaged in compression along an axis of movement between said members, said spring comprising a hollow body of elastomeric material, said body having a plurality of stepped wall portions of sequentially decreasing outside diameters, each adjacent pair of stepped wall portions being joined between their proximate ends by an intermediate area having an outer edge articulately joining one of said pair of stepped wall portions and an inner edge articulately joining the other of said pair of stepped wall portions, the edges at which said intermediate area joins the respective stepped wall portions constituting hinges about which said intermediate area flexes upon axial deformation of said spring, the width of said intermediate area being greater than the wall thickness of the greater diameter stepped wall portion adjoining it, the outside diameter of each stepped wall portion being less than the inside diameter of the stepped wall portion of greater diameter proximate thereto.

3. A spring assembly including two opposed relatively movable members and a spring mounted to at least one of said members to be engaged in compression along an axis of movement between said members, said spring comprising a hollow body of elastomeric material, said body having a plurality of stepped wall portions of sequentially decreasing outside diameters, each pair of proximate wall portions being joined together by an intermediate area, each said intermediate area being defined between an outer edge which articulately joins the stepped wall portion proximate to it which is of the greater diameter and an inner edge which articulately joins the stepped wall portion proximate to it which is of the lesser diameter, the edges at which each intermediate area joins the respective wall portions constituting hinge areas about which said intermediate area flexes upon axial deformation of said spring, the width of each intermediate area being greater than the wall thickness of the greater diameter wall portion joined by said intermediate area, the outside diameter of each stepped wall portion being constant along the line of intersection of an imaginary axial plane with said stepped wall portion and less than the inside diameter of the proximate stepped wall portion which is of greater diameter, said relatively movable members having surface areas disposed to bear upon said hinge areas around the peripheries thereof and thereby place said intermediate areas in direct compression between said members when said members are in closest proximity.

4. A variable deflection rate spring assembly including two opposed relatively movable members and a spring mounted to at least one of said members to be engaged in compression along an axis of movement between said members, said spring comprising a hollow, stepped, axially symmetric body of elastomeric material, said body having a plurality of cylindrical wall portions of sequentially decreasing outside diameters, the wall thicknesses of all said cylindrical wall portions being constant and equal, each pair of proximate wall portions being joined together by an annular area between them lying in a substantially radial plane, the edges at which said annular area joins the respective cylindrical wall portions constituting hinge areas about which said annular area can flex axially upon deformation of said spring, the width of each annular area being greater than the wall thickness of the greater diameter cylindrical wall portion which it joins, said width being less than the axial dimension of said greater diameter cylindrical wall portion, said assembly displaying a relatively high deflection rate as said hinge areas are flexed, said relatively movable members having surface areas engaging and bearing upon said hinge areas placing said annular areas in direct compression as said members are brought into closer proximity, said assembly thereupon displaying a lower deflection rate.

5. A variable deflection rate spring assembly including two opposed relatively movable members and a spring mounted to at least one of said members to be engaged in compression along an axis of movement between said members, said spring comprising a hollow, stepped, body of elastomeric material, said body having a plurality of stepped cylindrical wall portions of sequentially and regularly decreasing outside diameters, each pair of adjacent wall portions being joined together at their adjacent ends by an annular area between them lying in a substantially radial plane, the wall thicknesses of said cylindrical wall portions and annular areas being constant and equal, the edges at which each annular area joins the respective cylindrical wall portions constituting hinge areas about which said annular area flexes upon axial deformation of said spring, the width of each annular area being greater than the wall thickness of the greater diameter cylindrical wall portion which it joins, the outside diameter of the smaller of each pair of proximate cylindrical wall portions being smaller than the inside diameter of the larger of said pair, said assembly displaying a relatively high deflection rate as said hinge areas are flexed, said relatively movable members having surface areas engageable with said hinge areas around the entire peripheries thereof to place said annular areas in direct compression as said members are brought into closer proximity, said assembly thereupon displaying a lower deflection rate.

6. The spring of claim 5 wherein said spring is made of polyurethane having a hardness of 53 as measured on the Durometer D scale.

References Cited by the Examiner

UNITED STATES PATENTS 2,478,108 8/1949 Eaemmerling _____ 248—24
2,957,331 10/1960 Bruckman _____ 248—22 X

FOREIGN PATENTS 823,644 10/1937 France.
1,126,543 7/1956 France.

ARTHUR L. LA POINT, *Primary Examiner.*

R. W. WOHLFARTH, *Assistant Examiner.*